July 9, 1929.  W. G. COLES  1,720,390

TERMINAL CHECK VALVE

Filed May 4, 1927

Inventor
Wilfred G. Coles
By Dodge and Sons
Attorneys

Patented July 9, 1929.

1,720,390

UNITED STATES PATENT OFFICE.

WILFRED G. COLES, OF MADISON, WISCONSIN, ASSIGNOR TO MADISON-KIPP CORPORATION, OF MADISON, WISCONSIN, A CORPORATION OF WISCONSIN.

TERMINAL CHECK VALVE.

Application filed May 4, 1927. Serial No. 188,810.

This invention relates to lubrication, and particularly to force feed lubrication of steam power plants, and especially steam locomotives.

The object of the invention is to produce an improved terminal check valve, a terminal check valve being a valve interposed between the force feed lubricator and the steam engine and designed to prevent the back flow of steam from the engine to the lubricator, while permitting the flow of oil from the lubricator to the engine.

Prior to my invention it has been proposed to make use of a diaphragm actuated valve, the diaphragm being mechanically loaded in a valve closing direction and being subjected to pressure of oil in a valve opening direction so that the valve opened when the pressure on the oil exceeded a chosen valve which was as great as or greater than the maximum steam pressure encountered in the engine. It has also been proposed, prior to my invention, to dispense with the mechanical loading spring and to subject the diaphragm structure to fluid pressure, and more specifically boiler pressure acting in a valve closing direction. It has also been proposed to feed some of the pressure fluid which loads the diaphragm at a restricted rate into the oil discharge port, and no claim is here made to that feature broadly.

My invention relates to certain improvements in terminal check valves of the classes just described, the improvements being particularly applicable to the second class mentioned. It is in the nature of a modification or simplification of the valve shown in my prior but co-pending application Serial No. 179,030, filed March 28, 1927.

Figure 1:
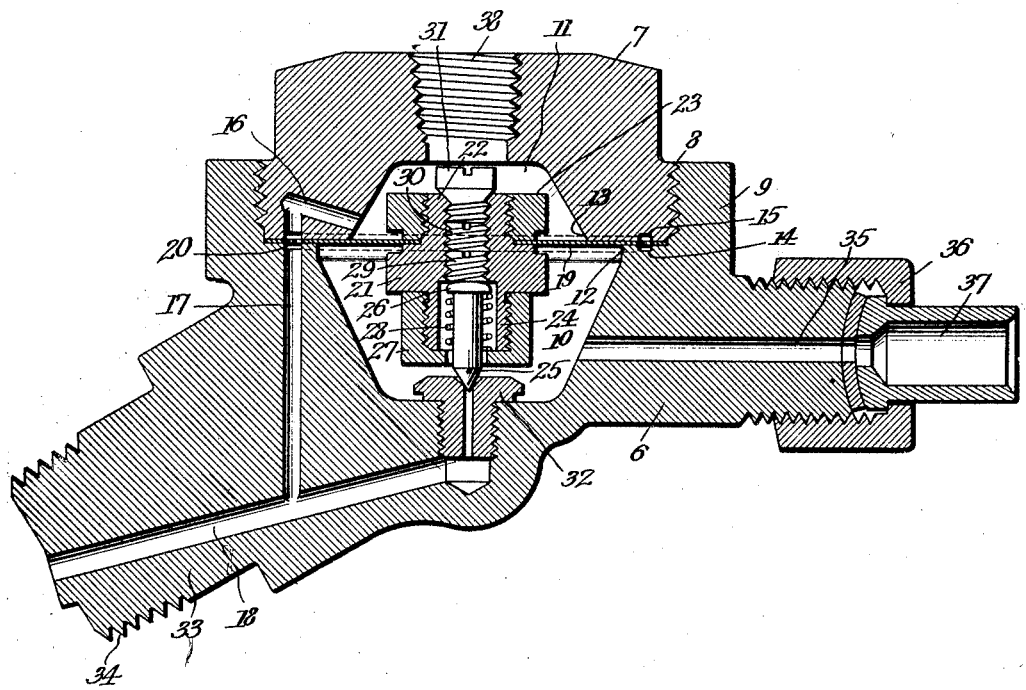

In the accompanying drawing, which illustrates the preferred embodiment of the invention, Fig. 1 is a vertical axial section of the complete check valve.

Figure 2:
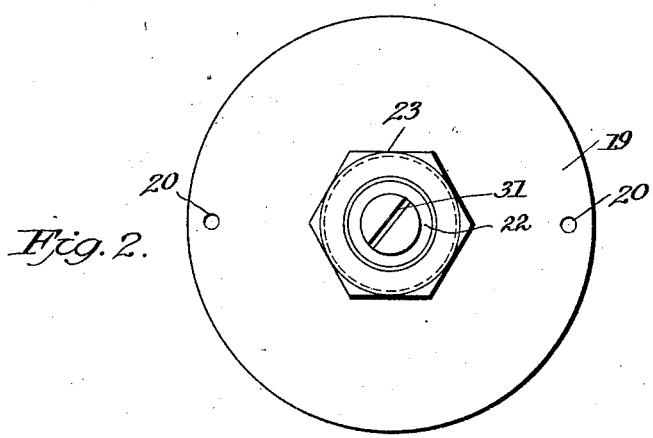

Fig. 2 is a plan view of the diaphragm assembly.

The casing of the check valve consists of a body 6 and a cap plug 7 threaded at 8 into a projecting annular flange 9 formed on the body. The body 6 is formed with an oil pressure chamber 10 and the cap 7 is formed with a steam pressure chamber 11 which terminate, respectively, in shoulders 12 and 13 formed on the body and cap. The shoulder 12 is of substantially greater internal diameter than the shoulder 13. The shoulder 12 is formed with an annular groove 14 and the shoulder 13 is formed with an annular groove 15, of equal diameters. A port 16 leads from the space 11 to the groove 15. A port 17 leads from the groove 14 to the oil discharge port 18. Clamped between the shoulders 12 and 13 is the diaphragm 19 which has through ports 20 connecting the grooves 14 and 15. There is thus a connecting passage from chamber 11 to passage 18 via passage 16, groove 15, ports 20, groove 14 and passage 17.

The diaphragm 19 carries a valve sustaining member 21 which is shouldered and formed with a threaded upward extension 22. This extends through a central aperture in the diaphragm and receives a nut 23, by means of which the member 21 is clamped and sealed to the diaphragm. The member 21 is provided with a tubular externally threaded extension 24 at its lower end and axially alined with the bore of this extension is a threaded opening which extends the entire length of the member 21. Mounted within the extension 24 is a pin valve 25 which has a head 26, and which is loosely guided by an annular cup nut 27 threaded on extension 24. A coil spring 28 surrounds the pin valve 25 and is confined between the cup nut 27 and head 26 of the valve.

The spring thus holds the valve in its upper or retracted position, which is determined by adjustment of a threaded plug 29 screwed into the threaded bore of member 21. Plug 29 is locked by a second threaded plug 30 and leakage is precluded by sealing screw 31 also screwed into the same bore and having a conical sealing surface.

Valve 25 coacts with valve seat bushing 32 which is threaded into body 6, to control a port leading to the oil discharge passage 18. The passage 18 terminates at the end of a nipple portion 33 integral with the body 6 and provided with pipe threads 34 by means of which the body 6 is attached to a steam passage leading to a steam or like motor. This may be any port under pressure to which it is desired to feed oil, for example, the main steam passage to the distributing valve.

Oil is received from a force feed lubricator, for example, one of the type shown in patent to Coles, No. 1,522,673, January 13, 1925, by way of passage 35 which is connected by means of union 36 with the oil delivery pipe 37 of the lubricator. A passage 38 formed with pipe threads leads directly to chamber 11 and to it is connected a pipe which conducts the loading pressure fluid to chamber 11. This is ordinarily live steam pressure and preferably boiler pressure, not controlled by the engine throttle, and hence active whenever the boiler is under steam.

This arrangement is preferred because on locomotive engines it is desirable to deliver steam through passages 16 and 17 to the oil passage 18 while the engine is drifting with the throttle closed, so as to atomize the oil when it would not otherwise be atomized because no steam is then flowing in the main steam passage.

The adjusting plug 29 is to ensure proper sealing of valve 25 when diaphargm 19 is not loaded. Adjustment is effected through passage 38 and requires only the disconnection of the boiler steam line leading thereto. Thus adjustment can be made while the diaphragm is mounted in position. This feature is claimed in my prior application above identified, as are the main features of the entire valve except the differential mounting of a single diaphragm.

This differential mounting results from the differential between the internal diameters of shoulders 12 and 13 and the effect is to give the valve a bias in favor of closing. Thus it is possible to proportion the valve so that an oil pressure of 250 pounds per square inch is necessary to open the valve against a boiler pressure of 200 pounds per square inch. Hence the valve can never open to permit flow of steam to the lubricator.

The operation of the device will be readily understood from the above description. The structure illustrated, with the exception of the diaphragm and mount, is more broadly claimed in my prior application, and hence is claimed here only in combination with the peculiar type of mount here disclosed.

What is claimed is,—

1. In a terminal check valve, the combination of a sectional hollow body having opposed clamping shoulders of different internal diameters; a diaphragm clamped between said shoulders and dividing the body into two chambers, one an oil pressure chamber to which the diaphragm presents a smaller exposed area than to the other; a valve connected with said diaphragm to be actuated thereby and controlling a passage leading from said oil pressure chamber to a point of use; means for conducting oil under pressure to said oil pressure chamber; and means for conducting fluid under pressure to said other pressure chamber.

2. In a terminal check valve, the combination of a hollow sectional body having opposed clamping shoulders of different internal diameters; a diaphragm clamped between said shoulders and in its normal unflexed condition in contact with said shoulders to the inner margins thereof, said diaphragm dividing said body into two pressure chambers, the chamber on the side of the diaphragm which engages the shoulders of larger diameter being an oil pressure chamber; a valve connected with said diaphragm, so as to be held closed when the diaphragm is in said normal unflexed condition and to be opened when the diaphragm yields under preponderating oil chamber pressure, said valve controlling a passage from the oil pressure chamber to a point of use; means for conducting oil under pressure to said oil pressure chamber; and means for conducting fluid under pressure to the other of said two chambers.

3. In a terminal check valve, the combination of a sectional hollow body having opposed clamping shoulders of different internal diameters; a diaphragm clamped between said shoulders and dividing the body into two chambers, one an oil pressure chamber to which the diaphragm presents a smaller effective area than to the other; a valve connected with said diaphragm to be actuated thereby and controlling a passage leading from said oil pressure chamber to a point of use; means for conducting oil under pressure to said oil pressure chamber; means for conducting fluid under pressure to said other pressure chamber; and means for adjusting said valve relatively to said diaphragm.

4. In a terminal check valve, the combination of a hollow sectional body having opposed clamping shoulders of different internal diameters; a diaphragm clamped between said shoulders and in its normal unflexed condition in contact with said shoulders to the inner margins thereof, said diaphragm dividing said body into two pressure chambers, the chamber on the side of the diaphragm which engages the shoulders of larger diameter being an oil pressure chamber; a valve connected with said diaphragm, so as to be held closed when the diaphragm is in said normal unflexed condition and to be opened when the diaphragm yields under preponderating oil chamber pressure, said valve controlling a passage from the oil pressure chamber to a point of use; means for conducting oil under pressure to said oil pressure chamber; means for conducting fluid under pressure to the other of said two chambers; and means for adjusting said valve relatively to said diaphragm.

5. In a terminal check valve, the combination of a hollow sectional body having opposed clamping shoulders of different internal diameters; a diaphragm clamped between said shoulders and in its normal unflexed condition in contact with said shoulders to the inner margins thereof, said diaphragm dividing said body into two pressure chambers, the chamber on the side of the diaphragm which engages the shoulders of larger diameter being an oil pressure chamber; a valve connected with said diaphragm, so as to be held closed when the diaphragm is in said normal unflexed condition and to be opened when the diaphragm yields under preponderating oil chamber pressure, said valve controlling a passage from the oil pressure chamber to a point of use; means for conducting oil under pressure to said oil pressure chamber; means for conducting fluid under pressure to the other of said two chambers; and means for discharging pressure fluid at a restricted rate from said other chamber into the oil discharged through said valve.

In testimony whereof I have signed my name to this specification.

WILFRED G. COLES.